United States Patent
Yamada

(10) Patent No.: US 8,582,476 B2
(45) Date of Patent: Nov. 12, 2013

(54) COMMUNICATION RELAY DEVICE AND COMMUNICATION RELAY METHOD

(75) Inventor: Daisuke Yamada, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 194 days.

(21) Appl. No.: 13/071,503

(22) Filed: Mar. 25, 2011

(65) Prior Publication Data

US 2011/0243058 A1 Oct. 6, 2011

(30) Foreign Application Priority Data

Mar. 30, 2010 (JP) ................................. 2010-077007

(51) Int. Cl.
*H04B 7/00* (2006.01)

(52) U.S. Cl.
USPC ............ 370/277; 380/270; 375/220; 709/225

(58) Field of Classification Search
None
See application file for complete search history.

(56) References Cited

U.S. PATENT DOCUMENTS

| 2002/0186688 A1* | 12/2002 | Inoue et al. | 370/352 |
| 2003/0097593 A1* | 5/2003 | Sawa et al. | 713/201 |
| 2007/0190973 A1* | 8/2007 | Goto et al. | 455/410 |
| 2008/0167003 A1* | 7/2008 | Wang et al. | 455/411 |
| 2010/0082999 A1* | 4/2010 | Ando et al. | 713/183 |

FOREIGN PATENT DOCUMENTS

| JP | 4218934 B | 3/2004 |
| JP | 2006-221605 | 8/2006 |
| JP | 2009-164971 A | 7/2009 |
| WO | WO-2009-011055 A1 | 1/2009 |

* cited by examiner

*Primary Examiner* — Jason Mattis
*Assistant Examiner* — James P Duffy
(74) *Attorney, Agent, or Firm* — Oblon, Spivak, McClelland, Maier & Neustadt, L.L.P.

(57) ABSTRACT

Connection determination methods are applied to determine whether relay of communication between one or more wireless communication devices and a wireless communication device which is different from the communication devices is permissible, and when a positive determination result is obtained by applying at least one of the methods, the relay is permitted by applying at least one of the methods. When the relay of communication is permitted by the permissible connection determination, the relay is executed.

9 Claims, 10 Drawing Sheets

COMMUNICATION RELAY DEVICE AND COMMUNICATION RELAY METHOD

CROSS REFERENCE TO RELATED APPLICATION

The disclosure of Japanese Patent Application No. 2010-077007, filed on Mar. 30, 2010, is incorporated herein by reference.

BACKGROUND OF THE INVENTION

1. Field of the Invention

The present invention relates to a communication relay device and a communication relay method.

2. Description of the Background Art

Conventionally, as a part of a network system performing data communication, access points are utilized which wirelessly communicate with wireless communication devices to connect the wireless communication devices to the network. In order to prevent access to a network by unauthorized users (also referred to as "unauthorized access"), the access points determine, when a wireless communication device is to be connected to a network, whether the connection can be permitted. For such determination, various methods are employed. For example, a method using an address which is unique to individual wireless communication devices (e.g., so called MAC address: Media Access Control address) is employed. In another example, a method using a common key (password) which is preliminarily registered to an access point and its corresponding wireless communication device (e.g., Wi-Fi Protected Access—pre-shared key (WPA-PSK), and WPA2-PSK) is employed. In another example, a method utilizing an authentication server (e.g., Extensible Authentication Protocol (WPA2-EAP)) in addition to an access point is employed (for these techniques, see Japanese Patent No. 4218934, for example).

An access point performs the determination based on a predetermined method. If the access point obtains a positive determination result from the determination using the method, the access point connects a wireless communication device to the network. If the access point does not obtain a positive determination result, the access point does not connect the wireless communication device to the network. Thus, if the access point cannot obtain a positive determination result for some reasons, the access point does not permit connection between the wireless communication device and the network even if the wireless communication device is a device owned by an authorized user. Examples of such reasons include, for example, communication failure in a communication route between the access point and the authentication server, and an incorrect setting by the user. For various reasons like these, there has been a possibility of impairing authorized users' convenience.

An object of the present invention is to solve one or more of the above-described problems, and to provide a technique of reducing the possibility of impairing the authorized users' convenience.

SUMMARY OF THE INVENTION

According to one aspect of the present invention, a relay device is provided. The relay device includes: a wireless interface for wireless communication with one or more wireless communication devices; a communication interface for connection with a communication line for communication with a communication device which is different from the one or more wireless communication devices; a permissible connection determination section for applying a plurality of methods of permissible connection determination of whether relay of communication between the one or more wireless communication devices and the different communication device is permissible, and for permitting the relay of communication when a positive determination result is obtained, by least one of the methods; and a relay execution section for executing the relay of communication when the permissible connection determination section permits the relay.

With this configuration, even if the relay device cannot obtain a positive determination result by applying one permissible connection determination method for some reason, the relay device can permit the relay when it obtains a positive determination result from another permissible connection determination method. Thus, it is possible to reduce the possibility of impairing the authorized user's convenience.

In a further aspect, the permissible connection determination section may apply the plurality of methods for the permissible connection determination methods in a preliminarily determined order, or may apply the plurality of methods for the permissible connection determination method in a descending order of security.

With this configuration, the permissible connection determination section applies the plurality of permissible connection determination methods in a descending order of security. Thus, it is possible to reduce the possibility of impairing the authorized user's convenience while preventing the user from unnecessarily applying a permissible connection determination method having a lower security level.

In a further aspect, the relay device may include an application order allocation section for allocate an application order in which the plurality of methods of permissible connection determination are applied in accordance with an instruction by a user. The permissible connection determination section may apply the plurality of methods of permissible connection determination in the application order allocated by the application order allocation section.

With this configuration, the permissible connection determination section applies the plurality of permissible connection determination methods in accordance with the application order allocated in accordance with the instruction by the user. Thus, it is possible to reduce the possibility of inconvenience caused by a case where a method not intended by the user is applied preferentially, and also possible to reduce the possibility of impairing the authorized user's convenience. For example, it is possible to avoid increase in time required for obtaining the permissible connection determination result.

In a further aspect, the relay device may include an identifier obtaining section configured to receive from one of the wireless communication devices which transmits a request for the relay a user identifier which identifies a user of the wireless communication device. The application order allocation section may allocate, in accordance with the instruction by the user, the application order in which the plurality of methods of permissible connection determination are applied and associates the user identifier with the application order, and the permissible connection determination section may apply the plurality of methods of permissible connection determination in the application order which is associated with the user identifier obtained by the identifier obtaining section.

With this configuration, the application order allocation section allocates the application order and associates the application order with the user identifier, and the permissible connection determination section applies the plurality of permissible connection determination methods in accordance with the application order associated with the user identifier. Thus, even if a preferable application order varies depending on the users, the relay device can perform permissible connection determination suitable to the requests of the respective users.

In a further aspect, the relay device may include an identifier obtaining section configured to receive, from one of the wireless communication devices which transmits a request for relay, a user identifier identifying the user of each wireless communication device; and an individual application order allocation section for allocating the application order in which the plurality of methods of permissible connection determination are applied, and associating the user identifier with the application order. The permissible connection determination section may apply the plurality of methods of permissible connection determination in the application order which is associated with the obtained user identifier, and the individual application order allocation section may reflect, in the application order, which of the plurality of methods of permissible connection determination has provided a positive determination result, and applies the reflected application order at the subsequent permissible connection determination.

With this configuration, the individual application order allocation section reflects, in the application order, which one of the permissible connection determination methods has provided a positive determination result. Thus, it is possible to apply a plurality of permissible connection determination methods in an order suitable to the wireless communication device used by the user.

In a further aspect, the relay device may include an application order output section for outputting information, which indicates the application order allocated to the plurality of methods of permissible connection determination, to the outside of the relay device so as to provide the information to a second relay device according to claim 1; and an application order obtaining section configured to receive, from the outside of the relay device, information indicating an application order allocated by the second relay device. The permissible connection determination section may apply the plurality of methods of permissible connection determination in the application order obtained by the application order obtaining section.

With this configuration, since the plurality of relay devices can share the application order, any of the plurality of relay devices can provide the same convenience to the user.

According to another aspect of the present invention, there is provided a method for relaying communication which includes the steps of: applying a plurality of methods of permissible connection determination of whether relay of communication between one or more wireless communication devices and a communication device which is different from the wireless communication devices is permissible by, and permitting the relay of communication, when a positive determination result is obtained by at least one of the methods; and executing the relay of communication when the relay is permitted by the permissible connection determination step.

According to still another aspect of the present invention, there is provided a nontransitory storage medium having stored therein a program for causing a computer to execute a process of relaying communication, the program causing the computer to execute the functions of: applying a plurality of methods of permissible connection determination of whether relay of communication between one or more wireless communication devices and a communication device which is different from the wireless communication devices is permissible, and permitting the relay of communication when a positive determination result is obtained by at least one of the methods; and executing the relay of communication when the relay is permitted by the permissible connection determination.

It should be noted that the present invention can be realized by various modes. For example, the present invention can be realized by a communication relay method, a communication relay device, a network system including the communication relay device, a computer program for realizing the method or the functions of the devices, a storage medium having stored therein the computer program, and the like.

DESCRIPTION OF THE PREFERRED EMBODIMENTS

Next, embodiments of the present invention will be described.

Figure 1:
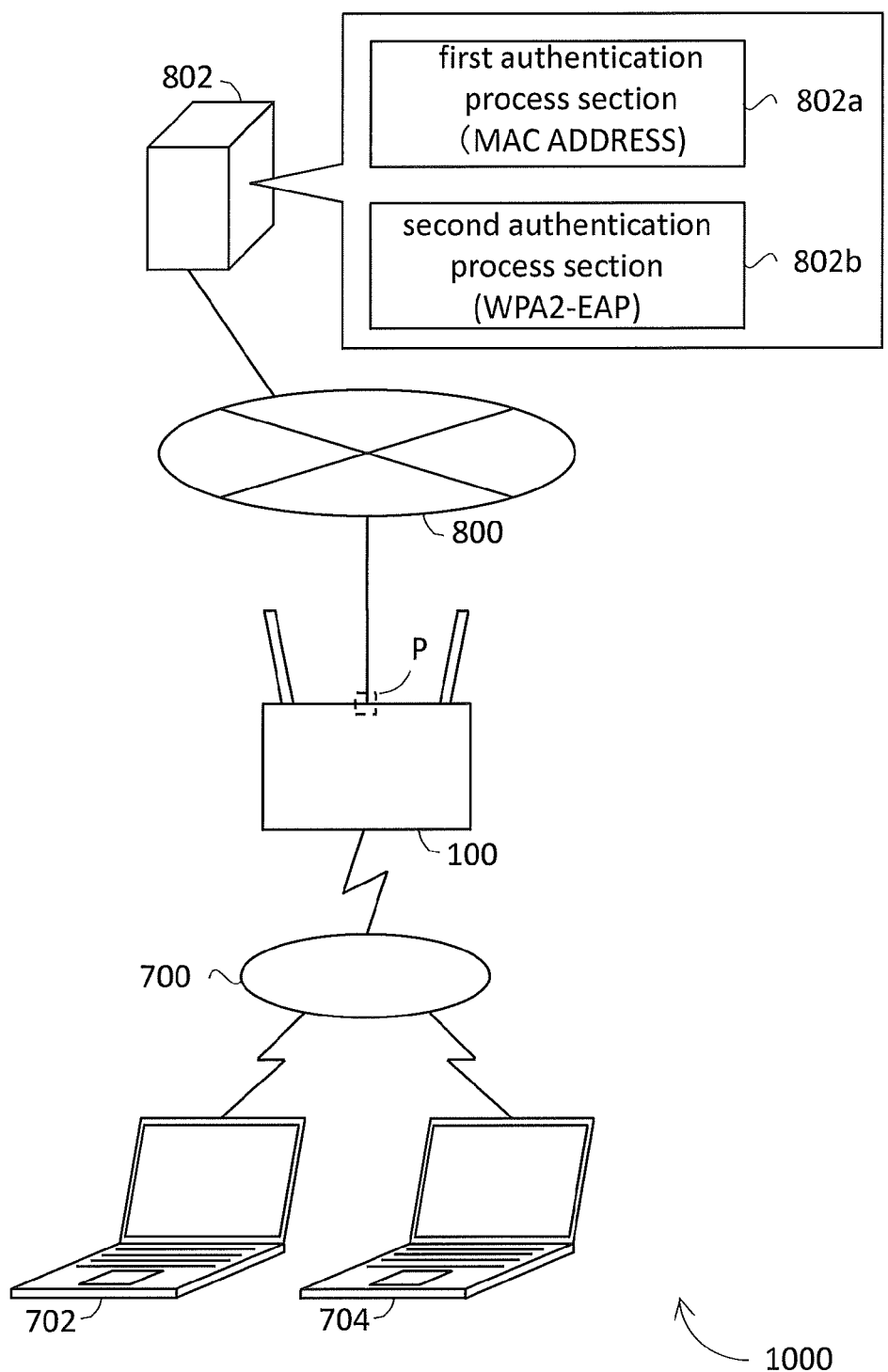
FIG. 1 is a diagram illustrating a network system 1000 according to a first embodiment of the present invention.

FIG. 1 is a diagram illustrating a network system 1000 according to a first embodiment of the present invention. The network system 1000 includes a relay device 100, a network 800 connected to the relay device 100 via a port P, an authentication server 802 connected to the network 800, and client devices 702 and 704 wirelessly connected to the relay device 100. The relay device 100 and the client devices 702 and 704 are wireless Local Area Network (LAN) communication devices which are compliant with the Institute of Electrical and Electronics Engineers (IEEE) 802.11 standard.

In this embodiment, the network 800 is an internal network structured within a limited range (for example, a LAN such as an intra-office network, and a Wide Area Network (WAN)

network such as a network of an Internet service provider which provides Internet connection). The network 800 is connected to the Internet (not illustrated).

The relay device 100 is a so-called access point (access point of a wireless LAN). The relay device 100 utilizes a wireless network 700 which is compliant with the IEEE802.11 standard to wirelessly communicate with the client devices 702 and 704, establishes a connection between the client devices 702 and 704 and the network 800, and thereby enables communication between various other communication devices which are connected to the network 800 (e.g., a Web server, a mail server, or a personal computer, which are not illustrated) and the client devices 702 and 704. Any communication devices that can perform wireless communication are adoptable as the client devices 702 and 704 (in this embodiment, the client devices 702 and 704 are personal computers). The type of the communication device connected to the wireless network 700 is not limited to a computer, but any type of device (e.g., home electrical appliances such as televisions, video cameras, and video recorders) is adoptable.

The authentication server 802 is a so-called Remote Authentication Dial In User Service (RADIUS) server. The authentication server 802 is used to determine whether connection by a wireless communication device to the network via the relay device 100 (communication relay) is permissible (hereinafter this determination is also referred to as "authentication or permissible connection determination").

In this embodiment, the authentication server 802 includes a first authentication process section 802a and a second authentication process section 802b. The first authentication process section 802a performs authentication using a MAC address (also referred to as "MAC-RADIUS authentication"). The MAC address corresponds to a layer 2 address. Layer 2 corresponds to the second layer (data link layer) of a so-called Open Systems Interconnection (OSI) reference model. The second authentication process section 802b performs WPA2-EAP authentication (i.e., Wi-Fi Protected Access 2—Extensible Authentication Protocol, compliant with IEEE802.11 i).

The relay device 100 performs permissible connection determination in response to a request from a wireless communication device (e.g., the client device 702, hereinafter simply referred to as "communication device"). If the relay device 100 inquires the first authentication process section 802a about a determination result, the relay device 100 obtains the determination result based on the MAC-RADIUS method. If the relay device 100 inquires the second authentication process section 802b about a determination result, the relay device 100 obtains the determination result based on the WPA2-EAP method. Alternatively, the relay device 100 itself can perform permissible connection determination without inquiring the authentication server 802. In such a case, the WPA-PSK (pre-shared key) method or the WPA2-PSK method, for example, is adoptable as the determination method. In this manner, the relay device 100 can employ a plurality of permissible connection determination methods.

If the permissible connection determination result is positive, the relay device 100 connects the communication device (e.g., the client device 702) to the network 800. Accordingly, the client device 702 becomes able to perform communication with various communication devices via the network 800.

Figure 2:
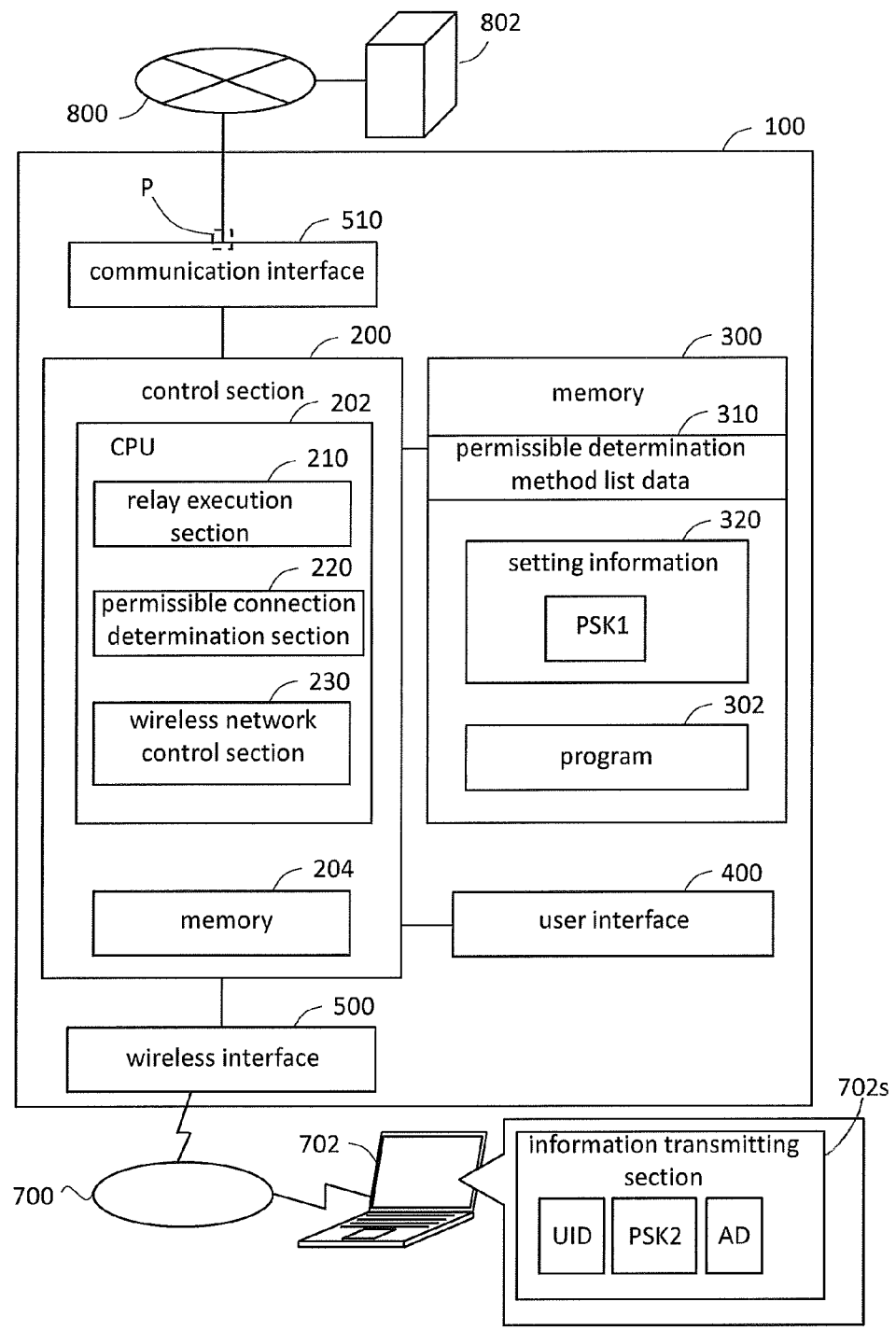
FIG. 2 is a block diagram illustrating a configuration of a relay device 100 according to the first embodiment.

FIG. 2 is a block diagram illustrating a configuration of the relay device 100. The relay device 100 includes a wireless interface 500 for wireless communication, a communication interface 510 for wired communication, a user interface 400, a control section 200 for controlling the relay device 100, and a nonvolatile memory 300 for storing various pieces of information.

The user interface 400 allows a user to directly perform settings of the relay device 100, and includes an operation section (e.g., switches and buttons), and a display section (e.g., lamp and liquid crystal display). The settings performed by the user are stored in the nonvolatile memory 300. The nonvolatile memory 300 is a writable memory. In this embodiment, the nonvolatile memory 300 stores programs of settings used for operation of the relay device 100, firmware programs, and the like. For example, a flash memory is adopted as the nonvolatile memory 300. The nonvolatile memory 300 stores permissible determination method list data 310, setting information 320, and a program 302.

The wireless interface 500 performs communication using the wireless network 700 compliant with the IEEE802.11. Any of IEEE802.11 a, b, g, and n may be adopted as the standard of the wireless network 700. Alternatively, standards other than the IEEE802.11 may be adopted.

The communication interface 510 is used for connection with a communication line compliant with the IEEE802.3. In this embodiment, the communication interface 510 has a port P, and the communication interface 510 is connected to the network 800 via the port P. The number of ports arranged in the communication interface 510 may be two or more. A standard other than the IEEE802.3 may alternatively be adopted as the standard of the communication network. For example, power line carrier communication (PLC) may be adopted. Alternatively, an interface for wireless communication may be adopted instead of the wired communication interface.

The control section 200 is a computer including a Central Processing Unit (CPU) 202 and a memory 204 (e.g., Dynamic Random Access Memory (DRAM)), and controls respective components of the relay device 100. The CPU 202 executes the program 302 stored in the nonvolatile memory 300, and thereby executes functions of various process sections including a relay execution section 210, a permissible connection determination section 220, and a wireless network control section 230. Hereinafter, execution of a function of a certain process section by the CPU in accordance with the program is also referred to as execution of the process by the certain process section.

The wireless network control section 230 controls the wireless interface 500 to establish the wireless network 700 using wireless communication. For example, the wireless network control section 230 sets a so-called Service Set Identifier (SSID), and performs communication with a communication device that has the same SSID value. Thus, the wireless network 700 can be identified using the SSID.

The relay execution section 210 relays communication between communication devices (e.g., the client device 702, or other relay devices not illustrated) which are connected to the communication interfaces (wireless interface 500 and communication interface 510). The relay execution section 210 performs a so-called routing function (function of routers or layer 3 switches) to relay communication. Information (e.g., route information, also referred to as a routing table) suitable for the routing function is stored in the nonvolatile memory 300 (not illustrated). It should be noted that the relay execution section 210 may perform other functions (e.g., a so-called bridging function (layer 2 switch function)) for communication relay in addition to, or instead of, the routing function. In addition, the relay execution section 210 may operate as a mere repeater. The layer 3 corresponds to the third layer (network layer) in the OSI reference model. Both of the wireless interface 500 and the communication interface 510 correspond to communication route interfaces for establishing a connection with a plurality of communication routes. For example, the wireless interface 500 establishes a communication route leading to the client device 702, and the communication interface 510 establishes a communication route leading to the network 800.

The permissible connection determination section 220 performs permissible connection determination. Details of the permissible connection determination performed by the permissible connection determination section 220 will be described later. As described above, the permissible connection determination section 220 can perform permissible connection determination using the authentication server 802 (FIG. 1), and also perform permissible connection determination by itself without using the authentication server 802. In this embodiment, the permissible connection determination section 220 performs permissible connection determination by applying a plurality of permissible connection determination methods in a predetermined application order. The application order is determined based on the permissible determination method list data 310 preliminarily stored in the nonvolatile memory 300.

Figure 3A:
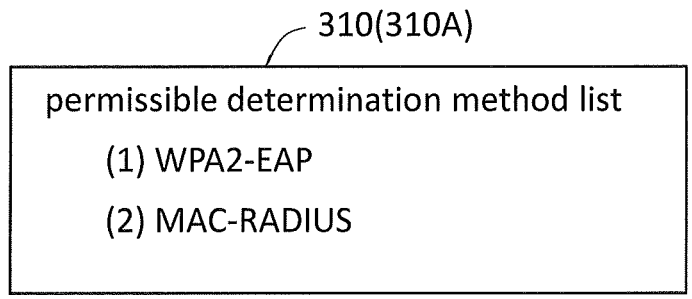
FIG. 3A is a diagram illustrating an example of permissible determination method list data 310 illustrated in FIG. 2.
Figure 3B:
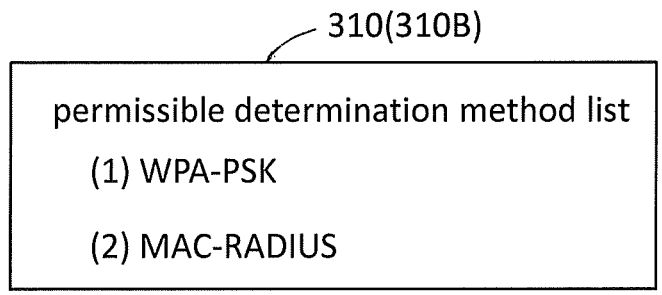
FIG. 3B is a diagram illustrating another example of the permissible determination method list data 310 illustrated in FIG. 2.
Figure 3C:
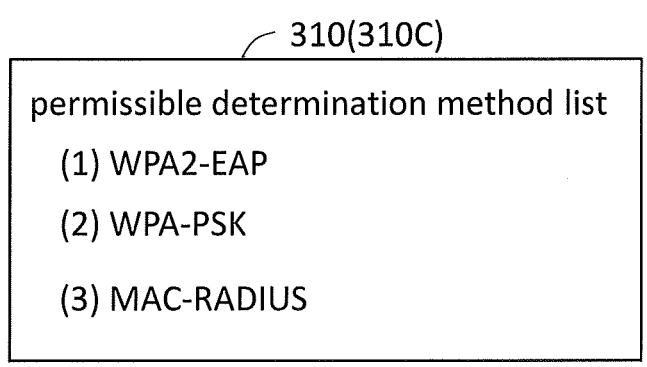
FIG. 3C is a diagram illustrating still another example of the permissible determination method list data 310 illustrated in FIG. 2.

FIG. 3A to FIG. 3C are diagrams illustrating three examples of the permissible determination method list data 310 (FIG. 2). The permissible determination method list data 310 in FIG. 3A (hereinafter, also referred to as first example permissible determination method list data 310A), and the permissible determination method list data 310 in FIG. 3B (hereinafter, also referred to as second example permissible determination method list data 310B) are each list data prepared so that two determination methods are able to be applied. The permissible determination method list data 310 in FIG. 3C (hereinafter, also referred to as third example permissible determination method list data 310C) is list data prepared so that three determination methods are able to be applied. The parenthesized numerals, e.g., (1), (2), (3), indicate the application order in which the permissible connection determination methods are applied.

In the first example permissible determination method list data 310A, the "WPA2-EAP method" is applied first and the "MAC-RADIUS method" is applied second. In the second example permissible determination method list data 310B, the "WPA-PSK method" is applied first, and the "MAC-RADIUS method" is applied second. In the third example permissible determination method list data 310C, the "WPA2-EAP method" is applied first, and the "WPA-PSK method" is applied second, and the "MAC-RADIUS method" is applied third. The nonvolatile memory 300 of the relay device 100 preliminarily stores the permissible determination method list data 310.

With reference back to FIG. 2, the permissible connection determination methods will now be described in further detail. If the permissible connection determination section 220 applies the WPA2-EAP method, it relays certain data between the communication device and the authentication server 802 (hereinafter, description will be given based on the assumption that the client device 702 is used as the communication device). The data relayed includes, for example, user identifiers used for user identification, certification data, and so-called "challenge and response". The client device 702 includes an information transmitting section 702s, and the information transmitting section 702s transmits information used for authentication (e.g., user identifier UID and certification data AD) to the authentication server 802 via the relay device 100. The information transmitting section 702s is also referred to as a "supplicant". The authentication server 802 (second authentication process section 802b (FIG. 1)) determines, based on an authentication process using the received data (information), whether to permit connection of the client device 702 to the network (communication relay), and provides the determination result to the relay device 100. There are a plurality of types of authentication methods using EAP (e.g., an EAP-TLS (Transport Layer Security), an EAP-TTLS (Tunneled TLS), an EAP-PEAP (Protected EAP)), and any authentication method is suitable.

If the permissible connection determination section 220 applies the MAC-RADIUS method, it obtains the MAC address of the client device 702 (communication device) from a packet (also referred to as a frame) received from the communication device, and transmits the obtained MAC address to the authentication server 802. The authentication server 802 (first authentication process section 802a (FIG. 1)) then refers to a preliminarily set MAC address list (list of MAC addresses of communication devices to which connections are permitted) to determine if the received MAC address is among those on the MAC address list. If the received MAC address is found on the MAC address list, then the first authentication process section 802a provides a positive determination result to the relay device 100. If the received MAC address is not found on the MAC address list, then the first authentication process section 802a provides a negative determination result to the relay device 100. In the case of applying the MAC-RADIUS method, the client device 702 does not need to include the information transmitting section 702s.

If the permissible connection determination section 220 applies the WPA-PSK method (or WPA2-PSK method), it performs permissible connection determination using a pre-shared key PSK1 preliminarily stored in the nonvolatile memory 300. The information transmitting section 702s of the client device 702 (communication device) also has a preliminarily set pre-shared key PSK2 for purposes of permissible connection determination. The permissible connection determination section 220 transmits/receives various data to/from the client device 702, and specifies whether the pre-shared key PSK2 of the client device 702 coincides with the pre-shared key PSK1 of the relay device 100. If they coincide with each other, the permissible connection determination section 220 obtains a positive determination result. If they do not coincide with each other, the permissible connection determination section 220 obtains a negative determination result.

Figure 4:
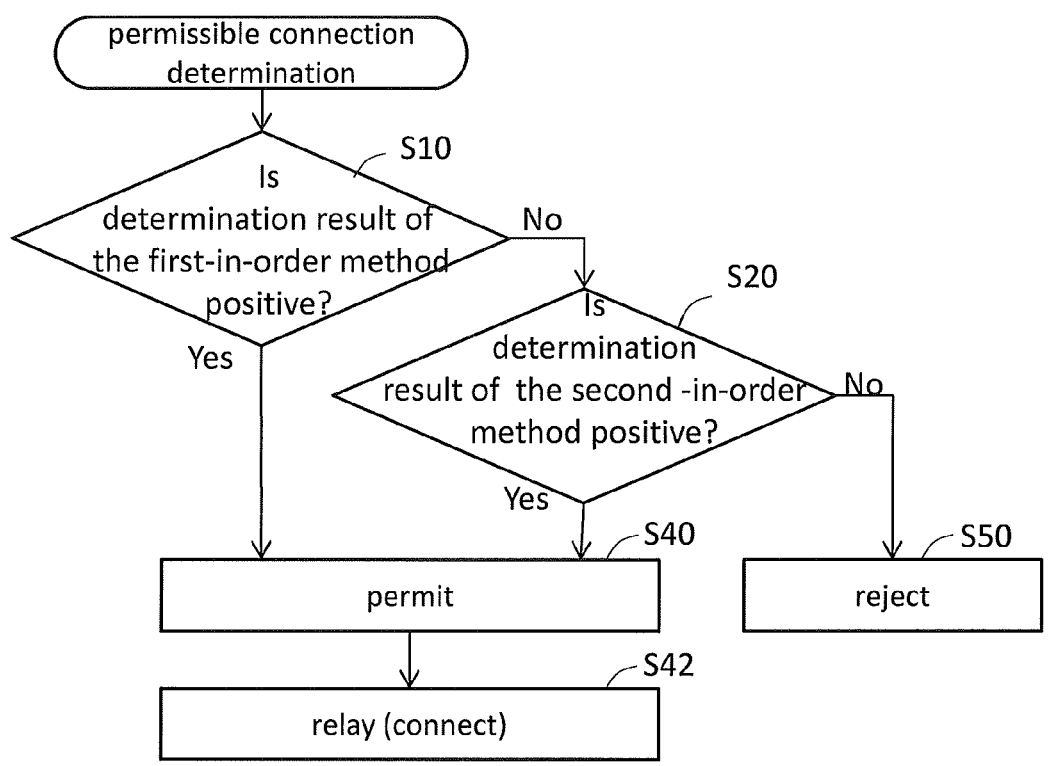
FIG. 4 is a flowchart showing a procedure of permissible connection determination according to the first embodiment.

FIG. 4 is a flowchart showing a permissible connection determination procedure according to this embodiment. If two permissible connection determination methods are in the permissible determination method list data 310 (FIG. 2, FIG. 3), the permissible connection determination section 220 (FIG. 2) performs permissible connection determination in accordance with the flowchart shown in FIG. 4. The permissible connection determination section 220 starts a determination process in response to a connection request from a communication device (e.g., the client device 702). In step S10, i.e., the first step, the permissible connection determination section 220 obtains a provisional determination result by applying the first permissible connection determination method, i.e., first-in-order permissible connection determination method, of the permissible determination method list data 310. For example, if the permissible determination method list data 310 is the first example permissible determination method list data 310A (FIG. 3A), the permissible connection determination section 220 applies the first-in-order permissible connection determination method of the first example permissible determination method list data 310A, which is the "WPA2-EAP method". If the permissible determination method list data 310 is the second example permissible determination method list data 310B (FIG. 3B), the permissible connection determination section 220 applies the first-in-order permissible connection determination method of the first example permissible determination method list data 310B, which is the "WPA-PSK method". If the obtained provisional determination result is positive, the permissible connection determination section 220 permits connection (relay) without applying the other (remaining) permissible connection determination method (step S40). In this case, in subsequent step S42, the relay execution section 210 connects the communication device to the network to relay communication therebetween. The wireless network control section 230 encrypts wireless communication in accordance with the permissible connection determination method which has provided the positive determination result. For example, if the "WPA2-EAP method" has provided the positive determination result, the wireless network control section 230 encrypts communication in accordance with the "WPA2-EAP method".

If the provisional determination result is negative, the permissible connection determination section 220 obtains, in subsequent step S20, a provisional determination result by applying the second permissible connection determination method, i.e., second-in-order permissible connection determination method of the permissible determination method list data 310. For example, if the permissible determination method list data 310 is the first example permissible determination method list data 310A (FIG. 3A), the permissible connection determination section 220 applies the second-in-order permissible connection determination method of the permissible determination method list data 310A, which is the "MAC-RADIUS method". If the permissible determination method list data 310 is the second example permissible determination method list data 310B (FIG. 3B), the permissible connection determination section 220 applies the second-in-order permissible connection determination method of the permissible determination method list data 310B, which is the "MAC-RADIUS method". If the obtained provisional determination result is positive, the permissible connection determination section 220 permits the connection (relay) (step S40). In this case, in subsequent step S42, the relay execution section 210 connects the communication device to the network to relay communication therebetween. On the other hand, if the provisional determination result is negative, the permissible connection determination section 220 rejects the connection (relay) (step S50). In this case, the relay execution section 210 neither connects the communication device to the network, nor relays communication by the communication device.

As described above, in this embodiment, if the permissible connection determination section 220 of the relay device 100 obtains a positive determination result from at least one of a plurality of permissible connection determination methods defined in the permissible determination method list data 310, it permits connection (relay) based on the permissible connection determination method from which the positive determination result is obtained. Thus, even if a positive determination result cannot be obtained from one of the permissible connection determination methods for some reason, as long as a positive determination result can be obtained using another permissible connection determination method, the permissible connection determination section 220 permits the connection (relay). Accordingly, it is possible to reduce the possibility of impairing the authorized users' convenience. For example, there may be a case where the user performs an incorrect setting for the WPA2-EAP method or the WPA-PSK method (e.g., the user may input a wrong user name or a wrong password on the client device 702). Even in such a case, as long as the permissible connection determination section 220 performs the permissible connection determination based on the first example permissible determination method list data 310A or the second example permissible determination method list data 310B, the connection may be permitted, for example, based on the second-in-order permissible connection determination method of the respective example permissible determination method list data 310A or 310B. In this manner, it is possible to reduce the possibility of impairing the authorized users' convenience.

Figure 5:
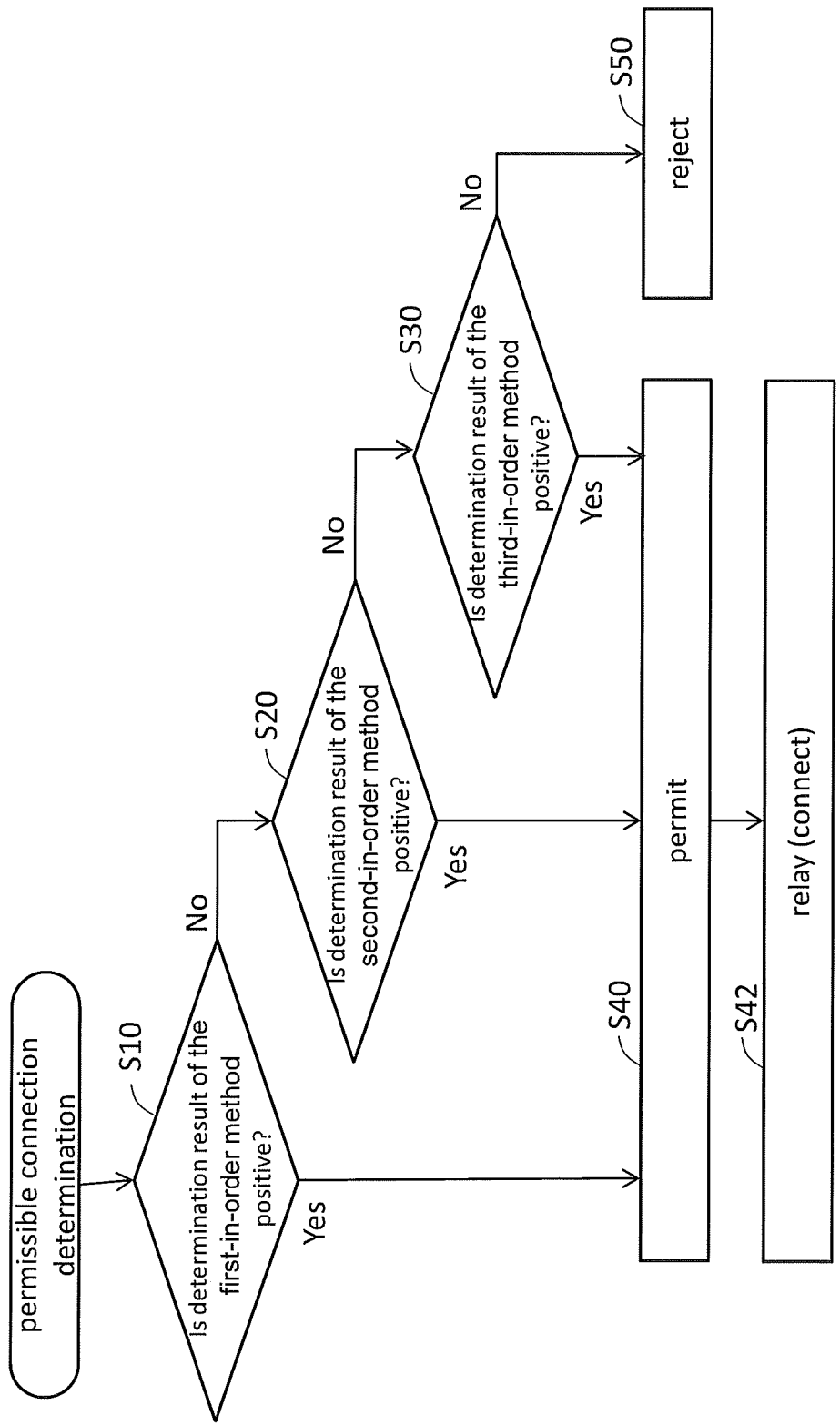
FIG. 5 is a flowchart showing another procedure of the permissible connection determination according to the first embodiment.

FIG. 5 is a flowchart showing another permissible connection determination procedure according to this embodiment. The permissible connection determination section 220 (FIG. 2) performs permissible connection determination in accordance with the flowchart shown in FIG. 5 in the case where three permissible connection determination methods are in the permissible determination method list data 310 (FIG. 2, FIG. 3) (e.g., in the case where the permissible determination method list data 310 is the third example permissible determination method list data 310C (FIG. 3C). The flowchart in FIG. 5 is different from that in FIG. 4 in that the flowchart in FIG. 5 additionally includes step S30 where the third permissible connection determination method, i.e., third-in-order permissible connection determination method, is applied. The other steps S10, S20, S40, S42, and S50 are the same as those steps in FIG. 4 having the same reference numerals, respectively.

The permissible connection determination section 220 performs step S30 if the provisional determination result obtained in step S20 is negative. In step S30, the permissible connection determination section 220 obtains a provisional determination result by applying the third-in-order permissible connection determination method of the permissible determination method list data 310. If the permissible determination method list data 310 is the third example permissible determination method list data 310C (FIG. 3C), the permissible connection determination section 220 applies the "WPA2-EAP method", "WPA-PSK method", and "MAC-RADIUS method" in steps S10, S20, and S30, respectively. If no positive determination result is obtained from any of the methods (No in step S30), the permissible connection determination section 220 rejects the connection (relay) (step S50). If a positive determination result is obtained from one of the methods, the permissible connection determination section 220 permits the connection (relay) (step S40).

It should be noted that the total number of the permissible connection determination methods applicable may alternatively be four or more. In such a case as well, the permissible connection determination section 220 applies the plurality of permissible connection determination methods in a predetermined application order. If a positive determination result is obtained from one of the plurality of permissible connection determination methods, the permissible connection determination section 220 permits the connection (relay). Accordingly, it is possible to further reduce the possibility of impairing the authorized users' convenience.

Further, in this embodiment, the permissible connection determination section 220 applies a plurality of permissible connection determination methods in a predetermined application order, and when the permissible connection determination section 220 has obtained a positive determination result, it ends the permissible connection determination without applying the remaining permissible connection determination methods (FIGS. 4 and 5). Therefore, the permissible connection determination section 220 can perform high-speed permissible connection determination as compared to a case where all the permissible connection determination methods are applied to obtain determination results.

In an alternative embodiment, permissible connection determination may be continued notwithstanding that a positive determination result is obtained. In such a case, for example, the permissible connection determination section 220 permits connection (relay) if a positive determination result is obtained from one or a multiple number of the plurality of permissible connection determination methods.

Further, the security level (i.e., difficulty in succeeding in unauthorized connection) may vary depending on the permissible connection determination methods. For example, a permissible connection determination method which uses dynamically generated values (e.g., random number generated each time permissible connection determination is performed) has a higher security level than a permissible connection determination method which uses static values (e.g., preliminarily set passwords). Specifically, the WPA2-EAP method has a higher security level than the MAC-RADIUS method. Generally, if a permissible connection determination method requires a longer time before an unauthorized connection can be established by requiring changing data originally provided to the relay device 100 and using all possible combinations of data for the permissible connection determination, i.e., by requiring use of a brute-force method, the security level of the permissible connection determination method can be high. For example, the WPA2-EAP method has a higher security level than the WPA-PSK method, and the WPA-PSK method has a higher security level than the MAC-RADIUS method. To compare the amount of time required before the unauthorized connection can be established for a plurality of permissible connection determination methods, a common communication device (e.g., a personal computer) can be used thereby to compare the time required for the respective permissible connection determination methods to complete brute-force attempts. Generally, the larger the number of times of the brute-force attempts is, the longer the time required to perform the brute-force attempt is.

Here, in the example shown in FIGS. 3A to 3C, the predetermined application order is set such that the permissible connection determination section 220 applies the plurality of permissible connection determination methods in a descending order of security level. Accordingly, it is possible to avoid unnecessary application of the permissible connection determination method having a low security level. For example, in the example shown in FIG. 3A, if the permissible connection determination section 220 (FIG. 2) can obtain a positive determination result by applying the WPA2-EAP method, it does not apply the MAC-RADIUS method. In this manner, the predetermined application order is set such that the permissible connection determination section 220 preferentially applies the permissible connection determination method having a higher security level. Thus, even in the case where eavesdropping on wireless communication is attempted, it is possible to reduce the possibility of the eavesdropping on the wireless communication applying a permissible connection determination method having a low security level. That is, it is possible to avoid unauthorized connection using a permissible connection determination method having a low security level.

Further, in this embodiment, the wireless network control section 230 (FIG. 2) encrypts wireless communication in accordance with the permissible connection determination method which has provided a positive determination result (step S42, FIGS. 4 and 5). Generally, the higher security level the permissible connection determination method has, the more the encryption strength of the communication, which depends on the permissible connection determination methods, increases. Thus, when the permissible connection determination section 220 preferentially applies the permissible connection determination method having a higher security level, the encryption strength for wireless communication can be increased. In the examples shown in FIGS. 3A to 3C, the predetermined application order is set such that the permissible connection determination section 220 applies a plurality of permissible connection determination methods in a descending order of their encryption strengths for wireless communication.

In this embodiment, as an encryption method (algorithm) for wireless communication, the wireless network control section 230 (FIG. 2) applies a method (algorithm) which is preliminarily associated with the permissible connection determination method which has provided a positive determination result. For example, the wireless network control section 230 applies an encryption method preliminarily selected by the user from among a plurality of predetermined encryption methods. The user may select an encryption method for each permissible connection determination method. The encryption methods selectable may change depending on the permissible connection determination methods. For example, for the "WPA2-EAP method", a Temporal Key Integrity Protocol (TKIP) and an Advanced Encryption Standard (AES) are selectable. For the "WPA-PSK method" as well, the TKIP and AES are selectable. For the "MAC-RADIUS method", "communication without encryption" is selectable. Alternatively, the wireless network control section 230 may apply a predetermined encryption method rather than the method selected by the user. In this embodiment, setting of the encryption method is stored in the nonvolatile memory 300 (e.g., the setting information 320).

The encryption strength varies depending on the encryption methods used. For example, the encryption strength of the communication encryption method which uses dynamically generated values (e.g., values generated at start of communication, or random numbers generated during communication) is higher than that of the communication encryption method which uses only static values (e.g., preliminarily set passwords). Generally, if an encryption method requires a longer time before improper communication decryption can be established as by requiring changing all possible combinations of data (e.g., encryption keys) required for decryption of the encrypted communication, i.e., by using the brute-force method, the encryption strength of the encryption method is considered to be higher. To compare encryption strength among a plurality of encryption methods, a common computer can be used thereby to compare the time required for the respective encryption methods to complete the brute-force attempts. Communication which is not encrypted can be considered to have lower encryption strength than an encrypted communication. Preferably, the permissible connection determination section 220 applies a plurality of permissible connection determination methods in a descending order of encryption strengths for wireless communication. For example, in this embodiment, the encryption strength of the WPA2-EAP method is higher than that of the WPA-PSK method, whereas the encryption strength of the WPA-PSK method is higher than that of the MAC-RADIUS method.

Data provided for permissible connection determination to the relay device 100 by the communication device (e.g., the client device 702 (FIG. 2)) depends on the permissible connection determination methods. For example, data required for the "WPA2-EAP method" is different form data required for the "WPA-PSK method". The communication device preferably provides the relay device 100 with the data required for a respective permissible connection determination in the same order as the application order of the permissible connection determination methods set in the relay device 100. For example, if the permissible determination method list data 310 of the relay device 100 is the third example permissible determination method list data 310C (FIG. 3C), the communication device preferably provides data as follows. That is, the communication device provides the relay device 100 with data required for the WPA2-EAP method. If the connection is not permitted, the communication device provides the relay device 100 with data required for the WPA-PSK method.

Figure 6:
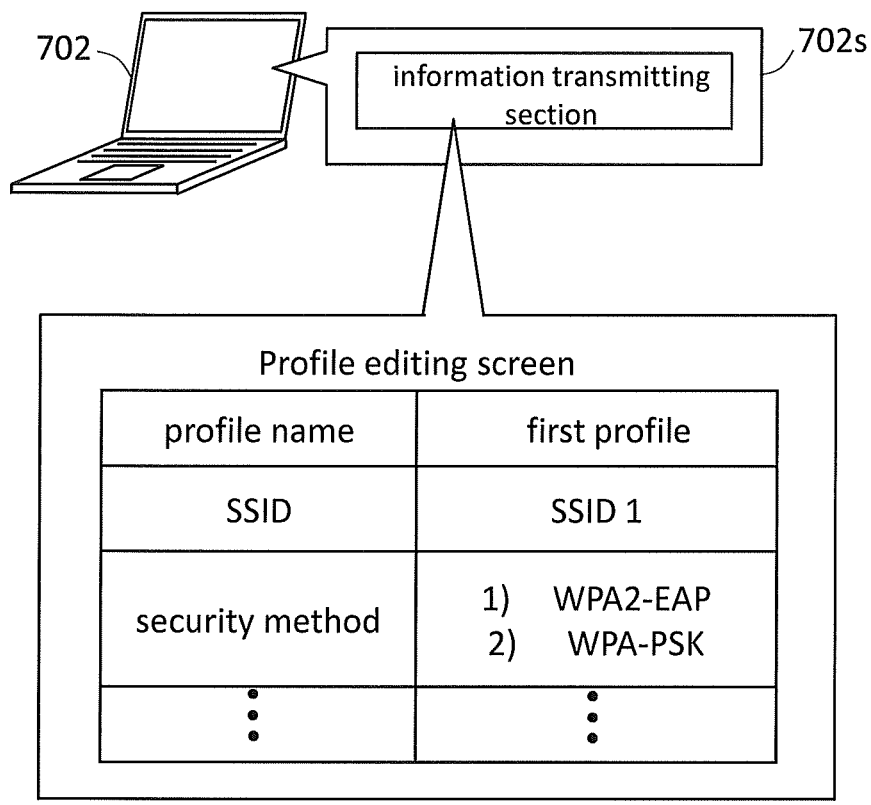
FIG. 6 is an explanatory diagram illustrating an example of a setting screen shown on a display of a client device 702 according to the first embodiment.

FIG. 6 is an explanatory diagram illustrating an example of a setting screen shown on a display of the client device 702. The setting screen is used to control operation of the information transmitting section 702s. The user operates the client device 702 while viewing the setting screen illustrated in FIG. 6, thereby setting wireless communication including the profile name, SSID (Service Set Identifier), and security method.

According to the example illustrated in FIG. 6, the information transmitting section 702s manages the settings for wireless communication as a profile. The profile name is a name used for specifying the profile. The SSID is an identifier for identification of the wireless network 700 (FIGS. 1 and 2). In this example, this setting item indicates a so-called Extended Service Set Identifier (ESSID). Alternatively, this setting item may indicate a so-called Basic Service Set Identifier (BSSID) of an access point. The security method represents the permissible connection determination method. The user can set a plurality of methods. In addition, the user can specify the application order of the methods. In the example illustrated in FIG. 6, the "WPA2-EAP method" and "WPA-PSK method" are registered, and the "WPA2-EAP method" is set as the first-in-order permissible connection determination method of the application order, and the "WPA-PSK method" is set as the second-in-order permissible connection determination method of the application order. In this embodiment, the user performs such setting based on the third example permissible determination method list data 310C shown in FIG. 3C.

The information transmitting section 702s transmits a request for the permissible connection determination to the relay device 100 in accordance with the set profile. In the example shown in FIG. 6, the information transmitting section 702s first provides the relay device 100 (FIG. 2) with data required for the "WPA2-EAP method". If the connection is not permitted, the information transmitting section 702s provides the relay device 100 with data required for the "WPA-PSK method". In this manner, the information transmitting section 702s of the client device 702 is preferably configured to provide the relay device 100 with the data required for a respective permissible connection determination method in accordance with the application order of the permissible connection determination methods set in the relay device 100.

It should be noted that the configuration of the communication device (e.g., client device 702) for setting the application order of the plurality of the permissible connection determination methods is not limited to the configuration illustrated in FIG. 6. Any other configuration may be adopted. For example, in the example in FIG. 6, a profile may be set to correspond to each permissible connection determination method. In this case, the user may set a plurality of profiles which corresponds to different permissible connection determination methods, respectively, and then set the application order of the profiles.

Figure 7:
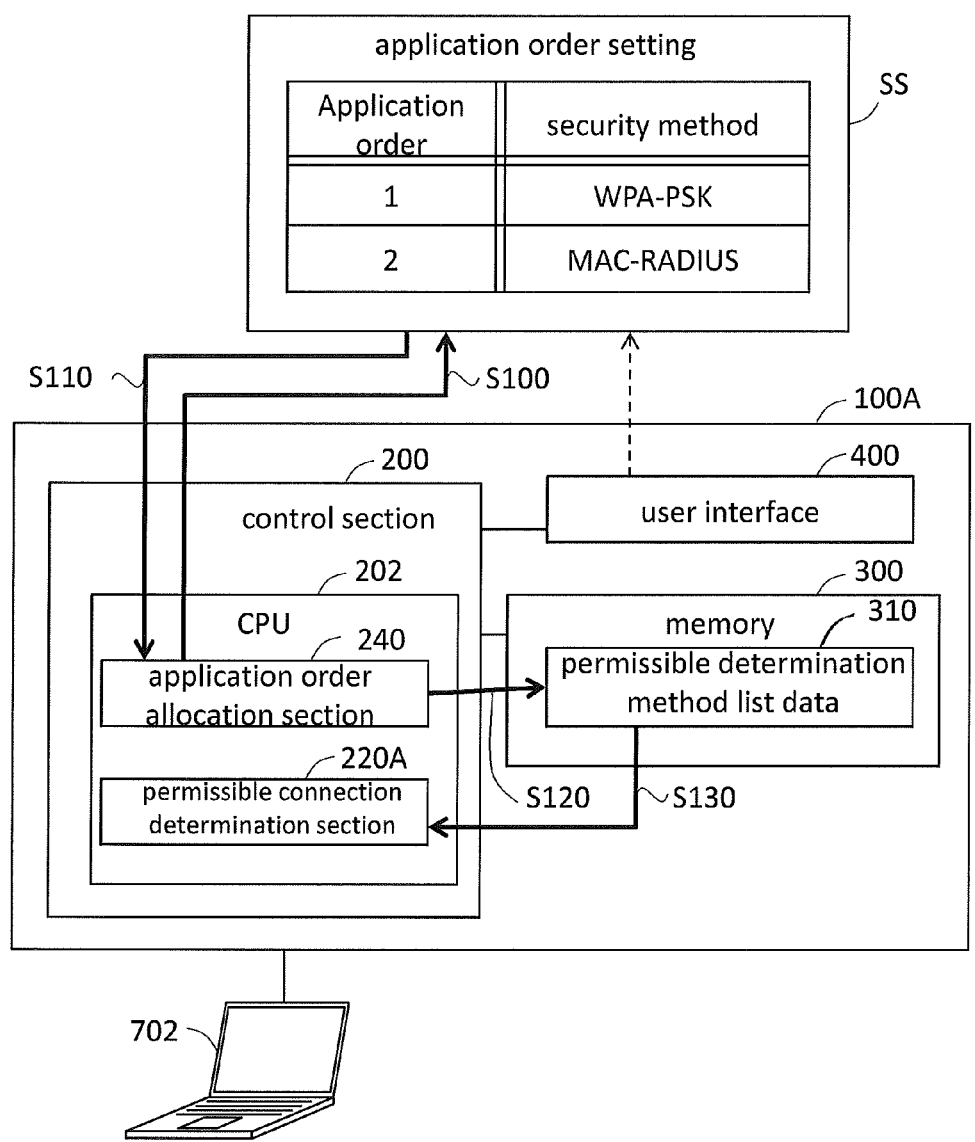
FIG. 7 is a block diagram illustrating a configuration of a relay device according to a second embodiment of the present invention.

FIG. 7 is a block diagram illustrating a relay device 100A according to a second embodiment of the present invention. The hardware configuration of the relay device 100A according to the second embodiment is the same as that of the relay device 100 according to the first embodiment illustrated in FIG. 2. Hereinafter, those components of the relay device 100A which are the same as those of the relay device 100 are denoted by the same reference numerals, respectively, and different components will be mainly described. FIG. 7 illustrates only a part of the configuration of the relay device 100A. Among the functions (process sections) in the CPU 202, the relay execution section 210 and the wireless network control section 230 are not illustrated, and among the data stored in the nonvolatile memory 300, the setting information 320 and the program (control program corresponding to the program 302) are not illustrated. It should be noted that the relay device 100A may be used instead of the relay device 100 according to the first embodiment.

The CPU 202 according to this embodiment, different from that in the first embodiment illustrated in FIG. 2, operates as an application order allocation section 240, in addition to the relay execution section 210 (not illustrated), a permissible connection determination section 220A, and the wireless network control section 230 (not illustrated). The process performed by the permissible connection determination section 220A according to this embodiment is slightly different from the process performed by the permissible connection determination section 220 according to the first embodiment illustrated in FIG. 2 (details to be described later).

The application order allocation section 240 allocates the application order to the plurality of permissible connection determination methods in accordance with the user's instruction. In the upper part of FIG. 7, an application order setting screen SS is shown. When the user operate an operation section (not illustrated) of the user interface 400, the application order allocation section 240 displays on the display section (not illustrated) of the user interface 400 the application order setting screen SS (step S100). When the user operates the user interface 400, the user can select the permissible connection determination methods (security method) used for permissible connection determination. Then the user can allocate the application order to the selected permissible connection determination methods. In this embodiment, the user selects the "WPA-PSK method" and the "MAC-RADIUS method", and allocates the "WPA-PSK method" as the first-in-order permissible connection determination method of the application order, and the "MAC-RADIUS method" as the second-in-order permissible connection determination method of the application order. The user can arbitrarily select one or more permissible connection determination methods from among a preliminarily prepared plurality of permissible connection determination methods. For example, the user can select other methods (e.g., "WPA2-EAP method"). Upon the user's setting completion operation, the application order allocation section 240 obtains the setting details (step S110). The application order allocation section 240 then stores the obtained setting details in the nonvolatile memory 300 as the permissible determination method list data 310 (step S120).

The permissible connection determination section 220A performs the permissible connection determination in the same manner as the permissible connection determination section 220 according to the first embodiment (FIGS. 4 and 5). Here, the permissible connection determination section 220A applies the plurality of permissible connection determination methods in application order allocated by the application order allocation section 240. For example, a case will be described where the communication device (e.g., client device 702) transmits to the relay device 100A a request for connection (relay) under a situation where the user performs a setting illustrated in FIG. 7. In this case, the permissible connection determination section 220A performs the permissible connection determination in accordance with the permissible determination method list data 310 (application order) set by the application order allocation section 240 (step S130). Specifically, the permissible connection determination section 220A performs the permissible connection determination in accordance with the flowchart shown in FIG. 4. The permissible connection determination section 220A determines whether the "WPA-PSK method" is permissible in step S10, and whether the "MAC-RADIUS method" is permissible in step S20, respectively.

As described above, in the second embodiment, the application order allocation section 240 allocates the application order to the plurality of permissible connection determination methods in accordance with a selection by the user, and the permissible connection determination section 220A applies the plurality of permissible connection determination methods in the application order allocated by the application order allocation section 240 thereby to perform the permissible connection determination. Accordingly, it is possible to avoid a case where a method which is not intended by the user is applied preferentially. For example, the user can carefully perform setting for a specific permissible connection determination method (e.g., WPA2-EAP method) with respect to the communication device (e.g., client device 702). In this case, the user allocates the permissible connection determination method as the first in the application order. Accordingly, the permissible connection determination method that is the first in order of the application order provides a positive determination result, and thus it is possible to reduce the possibility of increase in time required for obtaining the permissible connection determination result. In addition, the user may allocate as the first in the application order the permissible connection determination method (e.g., MAC-RADIUS method) which does not require any setting with respect to the communication device (e.g., client device 702). Accordingly, the user does not need to perform any setting for permissible connection determination with respect to the communication device, and thus it is possible to reduce the possibility of increase in time required for obtaining the permissible connection determination result.

It should be noted that, the application order allocation section 240 (FIG. 7) may receive the user's instruction based on another method which does not use the user interface 400. For example, the application order allocation section 240 may display on a terminal, connected to the wireless interface 500 (FIG. 2) or the communication interface 510, a web page for setting, and perform the setting in accordance with an instruction inputted by the user through the web page. In addition, the application order allocation section 240 may perform the setting in accordance with an instruction inputted by the user through the terminal connected to a management port (not illustrated) provided in the relay device 100A. Alternatively, the terminal connected to the wireless interface 500 (FIG. 2) or the communication interface 510 may execute dedicated software for the setting.

Figure 8:
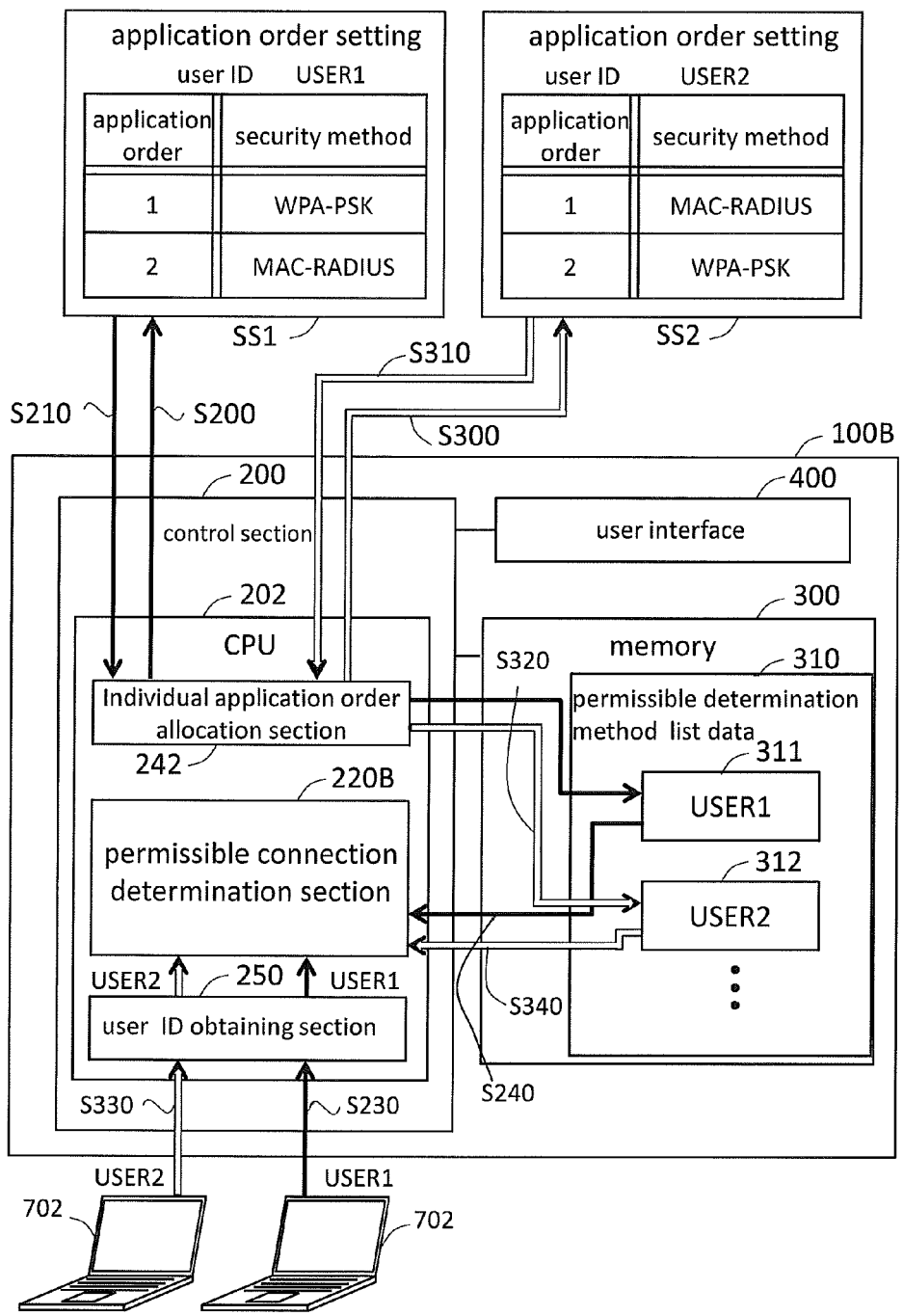
FIG. 8 is a block diagram illustrating a configuration of a relay device according to a third embodiment of the present invention.

FIG. 8 is a block diagram illustrating a relay device 100B according to a third embodiment of the present invention. The hardware configuration of the relay device 100B according to the third embodiment is the same as that of the relay device 100 according to the first embodiment illustrated in FIG. 2. Hereinafter, those components of the relay device 100B which are the same as those of the relay device 100 are denoted by the same reference numerals, respectively, and different components will be mainly described. FIG. 8 illustrates only a part of the configuration of the relay device 100B. Among the functions (process sections) in the CPU 202, the relay execution section 210 and the wireless network control section 230 are not illustrated, and among the data stored in the nonvolatile memory 300, the setting information 320 and the program (control program corresponding to the program 302) are not illustrated. It should be noted that the relay device 100B may be used instead of the relay devices 100 and 100A in the above respective embodiments.

The CPU 202 according to this embodiment, different from that in the first embodiment, operates as an individual application order allocation section 242 and a user ID obtaining section 250 in addition to the relay execution section 210 (not illustrated), a permissible connection determination section 220B, and the wireless network control section 230 (not illustrated). The process performed by the permissible connection determination section 220B according to this embodiment is slightly different from the process performed by the permissible connection determination section 220 according to the first embodiment and by the permissible connection determination section 220A illustrated in FIG. 7 (details to be described later).

In the same manner as the relay device 100A according to the second embodiment illustrated in FIG. 7, the relay device 100B according to this embodiment allocates, in accordance with the user's instruction, the application order to the plurality of permissible connection determination methods. However, unlike the second embodiment, the relay device 100B according to this embodiment manages the correspondence relation between the permissible connection determination method and the application order for each user ID.

The user ID obtaining section 250 obtains, from a communication device (e.g., client device 702) which requests a connection (relay), a user identifier identifying the user. The user ID obtaining section 250 may adopt, for example, the user identifier that is used in the WPA2-EAP method. In this case, the user ID obtaining section 250 analyzes data for the WPA2-EAP method provided by the communication device, and obtains the user identifier based on the analysis. Alternatively, the user ID obtaining section 250 may adopt as the user identifier the MAC address of the communication device. In this case, the user ID obtaining section 250 analyzes the header of a packet provided by the communication device, and obtains the user identifier based on the analysis.

In the same manner as the application order allocation section 240 according to the second embodiment illustrated in FIG. 7, the individual application order allocation section 242 allocates the application order to the plurality of permissible connection determination methods in accordance with the user's instruction. Here, in addition to the correspondence relation between the permissible connection determination method and the application order, the user provides the individual application order allocation section 242 with an instruction including the user identifier. In this embodiment, processes (step S200 to S220) of a case where the user identifier is "USER1", and processes (step S300 to S320) of a case where the user identifier is "USER2" are described.

When the user inputs an instruction including the user identifier (USER1 in this case) to the user interface 400, the individual application order allocation section 242 displays on the display section (not illustrated) of the user interface 400 an application order setting screen SS1 corresponding to the user identifier (step S200). In this embodiment, the user sets the "WPA-PSK method" as the first-in-order permissible connection determination method of the application order, and the "MAC-RADIUS method" as the second-in-order permissible connection determination method of the application order. Upon the user's setting completion operation, the individual application order allocation section 242 obtains the setting details (step S210). The individual application order allocation section 242 associates the obtained setting details with the user identifier (USER1) to store the associated setting detail in the nonvolatile memory 300 (step S220: permissible determination method list data 311).

When a user inputs an instruction including another user identifier (e.g., USER2) to the user interface 400, the individual application order allocation section 242 similarly associates another permissible determination method list data 312 with the user identifier (USER2) and stores the associated data in the nonvolatile memory 300. Here, steps S300, S310, and S320 are the same as steps S200, S210, and S220, respectively. In this embodiment, the user sets the "MAC-RADIUS method" as the first-in-order permissible connection determination of the application order, and sets the "WPA-PSK method" as the second permissible connection determination of the application order through an application order setting screen SS2 for the other user identifier (USER2). In this manner, the permissible connection determination method to be used may vary depending on the user identifiers.

In the same manner as the permissible connection determination section 220A according to the second embodiment illustrated in FIG. 7, the permissible connection determination section 220B applies a plurality of permissible connection determination methods based on the application order allocated by the individual application order allocation section 242. However, unlike the permissible connection determination section 220A according to the second embodiment, the permissible connection determination section 220B obtains the user identifiers from the user ID obtaining section 250, and performs the permissible connection determinations based on the permissible determination method list data which is associated with the obtained user identifiers. For example, it will be assumed that the user identifier of the client device 702 is "USER1", whereas the user identifier of a client device 704 is "USER2". If a connection request is received from the client device 702, the user ID obtaining section 250 obtains the user identifier (USER1) from the client device 702, and provides the obtained user identifier to the permissible connection determination section 220B (step S230). The permissible connection determination section 220B performs the permissible connection determination in accordance with the permissible determination method list data 311 (application order) which is associated with the obtained user identifier (USER1) (step S240). Similarly, if a connection request is received from the client device 704, the permissible connection determination section 220B performs the permissible connection determination in accordance with the permissible determination method list data 312 which is associated with the user identifier (USER2) (steps S330 and S340 are the same as steps S230 and S240, respectively).

As described above, in this embodiment, the individual application order allocation section 242 allocates the application order to the plurality of permissible connection determination methods while associating the application order with the user identifier. Then, the permissible connection determination section 220B applies the plurality of permissible connection determination methods based on the application order which is associated with the user identifier, thereby to perform the permissible connection determination. Accordingly, even if the preferable application order varies depending on the users, the relay device 100B can perform the permissible connection determination appropriately in response to the respective users' requests. The total number of the user identifiers manageable by the relay device 100B may alternatively be three or more.

Further, in this embodiment, the individual application order allocation section 242 selects, in accordance with the user's instruction, a plurality of permissible connection determination methods to be used, and allocates the application order to the selected plurality of permissible connection determination methods. Accordingly, even if preferable permissible connection determination methods differ depending on the users, the relay device 100B can perform the permissible connection determination appropriately in response to the respective users' requests.

In the same manner as in the second embodiment illustrated in FIG. 7, the user interface 400 need not necessarily be used, but various methods may be adopted for the individual application order allocation section 242 to receive a user's instruction.

Figure 9:
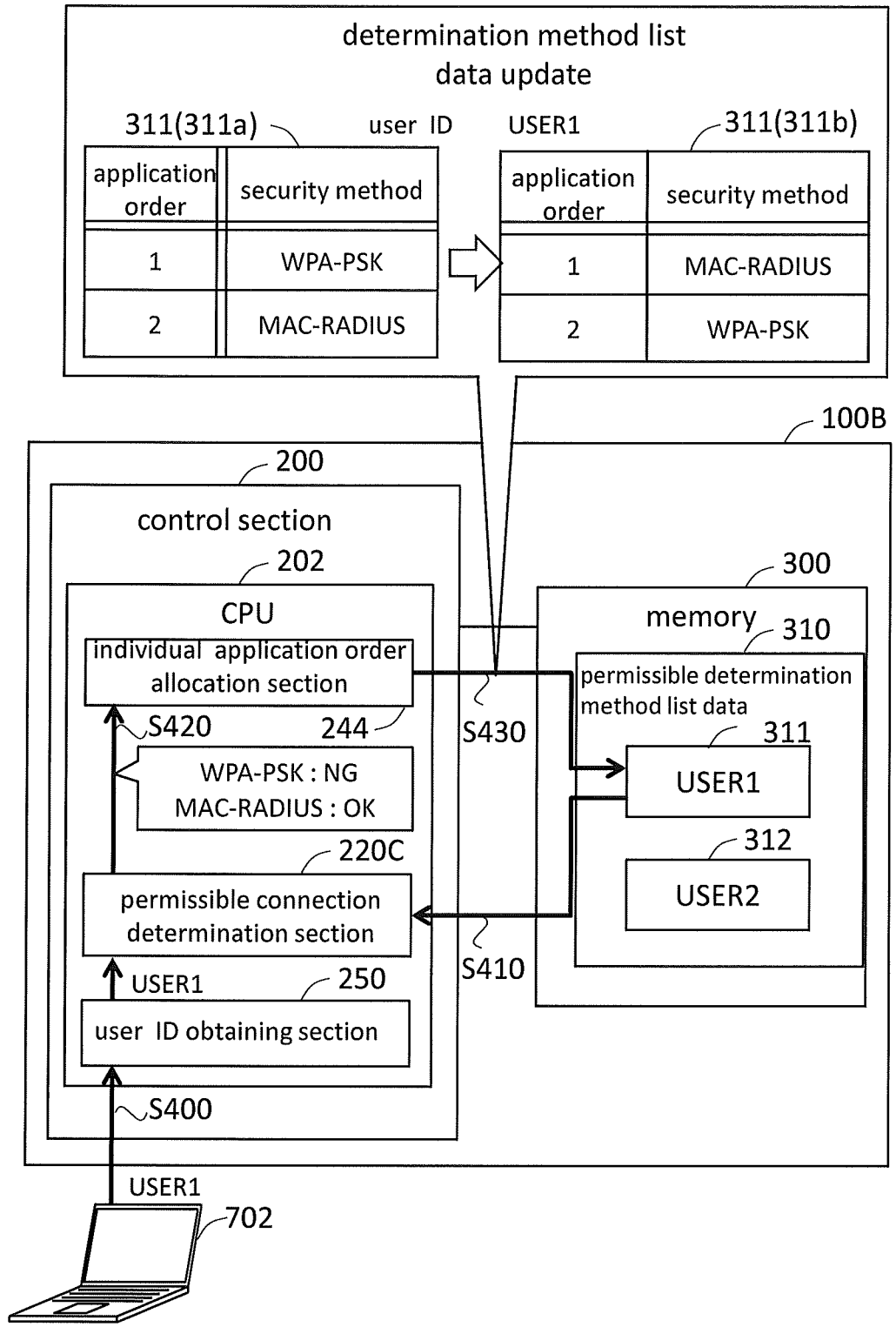
FIG. 9 is a block diagram illustrating a configuration of a relay device according to a fourth embodiment of the present invention.

FIG. 9 is a block diagram illustrating a relay device 100C according to a fourth embodiment of the present invention. The hardware configuration of the relay device 100C according to this embodiment is the same as that of the relay device 100 in FIG. 2. Hereinafter, those components of the relay device 100C which are the same as those of the relay device 100 are denoted by the same reference numerals, respectively, and different components will be mainly described. FIG. 9 illustrates only a part of the configuration of the relay device 100C. Among the functions (process sections) in the CPU 202, the relay execution section 210 and the wireless network control section 230 are not illustrated, and among the data stored in the nonvolatile memory 300, the setting information 320 and the program (control program corresponding to the program 302) are not illustrated. It should be noted that the relay device 100C may be used instead of the relay devices 100, 100A, and 100B in the above respective embodiments.

The CPU 202 in this embodiment, different from that in the first embodiment in FIG. 2, operates as an individual application order allocation section 244, and a user ID obtaining section 250 in addition to the relay execution section 210 (not illustrated), a permissible connection determination section 220C, and the wireless network control section 230 (not illustrated). The process performed by the permissible connection determination section 220C in this embodiment is slightly different from the process performed by the permissible connection determination section 220 in the first embodiment, the process performed by the permissible connection determination section 220A in the second embodiment in FIG. 7, and the process performed by the permissible connection determination section 220B in the third embodiment in FIG. 8 (details to be described later).

In the same manner as the relay device 100B in the third embodiment illustrated in FIG. 8, the relay device 100C in this embodiment manages the correspondence relation between the permissible connection determination method and the application order for each user identifier. However, unlike in the third embodiment, the relay device 100C in this embodiment updates the permissible determination method list data such that a higher priority in the application order is allocated to the permissible connection determination method that has provided a positive determination result.

The user ID obtaining section 250 in this embodiment is the same as the user ID obtaining section 250 in the third embodiment. The user ID obtaining section 250 obtains user identifiers from communication devices.

The individual application order allocation section 244 allocates the application order to the plurality permissible connection determination methods for each user ID. Specifically, the individual application order allocation section 244 updates the permissible determination method list data such that the permissible connection determination method which has provided a determination result is allocated with a higher priority in the application order. The individual application order allocation section 244 updates the permissible determination method list data while associating the data with the respective user identifiers. FIG. 9 illustrates a state where the individual application order allocation section 244 updates the permissible determination method list data 311 for the client device 702 (USER1).

If a connection request is received from the client device 702, the user ID obtaining section 250 obtains the user identifier (USER1 in this case) from the client device 702, and provides the obtained user identifier to the permissible connection determination section 220C (step S400). The permissible connection determination section 220C performs the permissible connection determination in accordance with the permissible determination method list data 311 which is associated with the obtained user identifier (USER1) (step S410). The permissible determination method list data 311a illustrated in the upper left of FIG. 9 is a determination method list 311 at that point of time. In the permissible determination method list data 311a, the "WPA-PSK method" is allocated as the first-in-order permissible connection determination method of the application order, and the "MAC-RADIUS method" is allocated as the second-in-order permissible connection determination method of the application order.

It will be assumed that the "WPA-PSK method", which is the first in order of the application order provides a negative determination result, and the "MAC-RADIUS method", which is the second in order of the application order provides a positive determination result. The permissible connection determination section 220C notifies the individual application order allocation section 244 that the permissible connection determination method that has provided a positive determination result is the "MAC-RADIUS method" (step S420). The individual application order allocation section 244 updates the permissible determination method list data 311 such that the permissible connection determination method (i.e., MAC-RADIUS method, hereinafter also referred to as a "successful determination method") is allocated as the first-in-order permissible connection determination method of the application order (step S430). In this embodiment, the individual application order allocation section 244 lowers a permissible connection determination method which is set higher in the application order than a successful determination method to a lower priority in the application order, and thereby updates the permissible determination method list data 311. An updated permissible determination method list data 311b is illustrated in the upper right of FIG. 9. In the permissible determination method list data 311b, the "WPA-PSK method" is allocated as the second-in-order permissible connection determination method of the application order, and the "MAC-RADIUS method" is allocated as the first-in-order permissible connection determination method of the application order.

Next, upon reception of a connection request from the client device 702, the permissible connection determination section 220C performs the permissible connection determination in accordance with the updated permissible determination method list data 311b. Generally, the user will not update the setting of the client device 702 frequently. Thus, it is highly likely that the permissible connection determination method which provides a positive determination result at the current permissible connection determination also provided a positive determination result at the previous permissible connection determination. Accordingly, if permissible connection determination section 220C performs the permissible connection determination in accordance with the updated permissible determination method list data 311b, it is possible to reduce the possibility of increase in time required for obtaining the permissible connection determination result.

As a method for updating the permissible determination method list data, any method may be adopted as long as the method reflects, in the application order, which of the plurality of permissible connection determination methods has provided a positive determination result. Accordingly, the permissible connection determination section 220A can apply the plurality of permissible connection determination methods in an order suitable to the wireless communication device used by the respective users. Here, "to reflect, in the application order, which of the plurality of permissible connection determination methods has provided a positive determination result" means to perform an arbitrary process to allocate a higher priority in the application order to the permissible connection determination method that has provided a positive determination result. For example, the individual application order allocation section 244 may allocate as the first-in-order permissible connection determination method of the application order the method that has provided a positive determination result. Alternatively, the individual application order allocation section 244 may allocate a higher priority in the application order to those methods which have provided a greater number of positive determination results.

Figure 10:
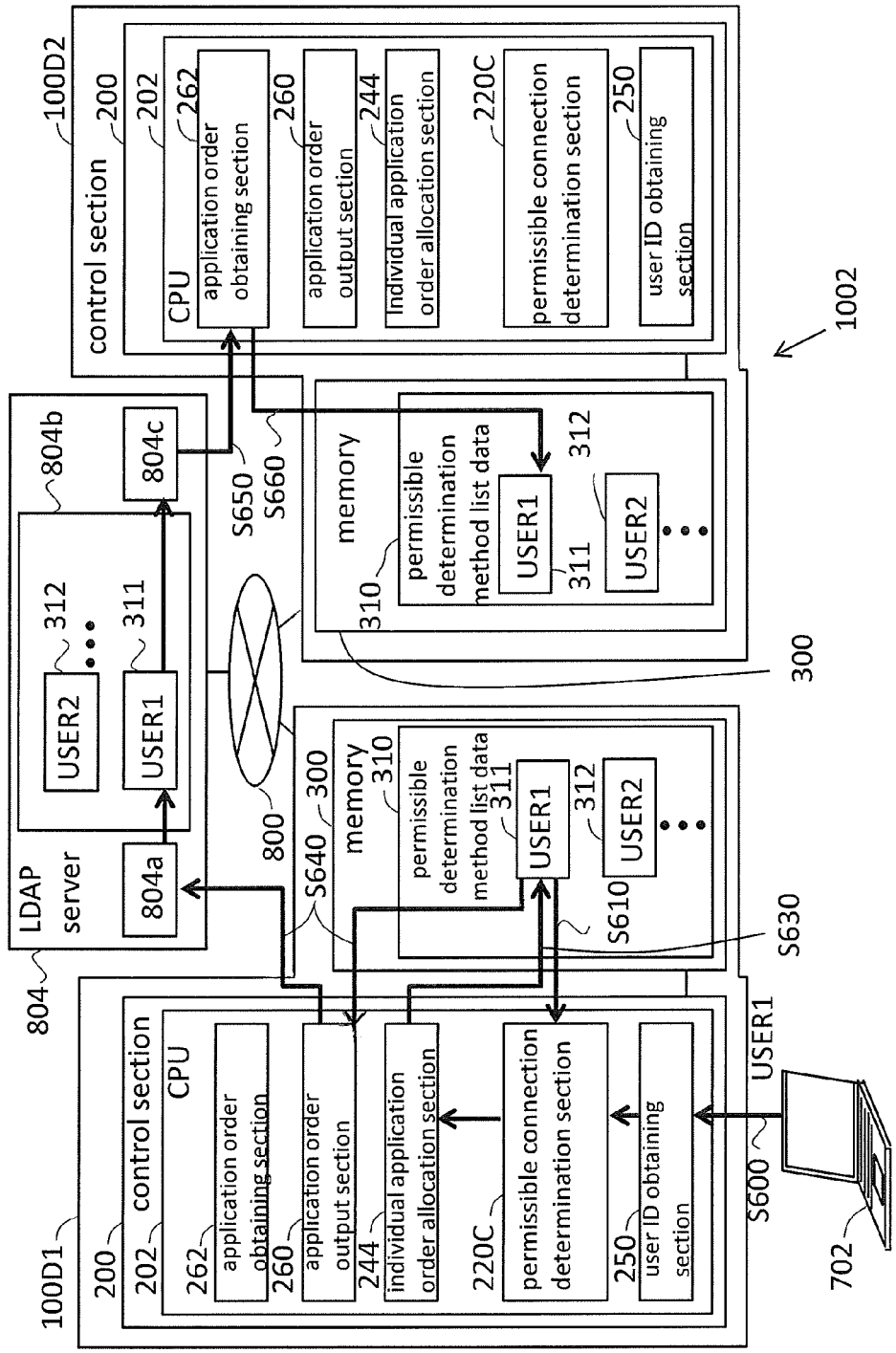
FIG. 10 is an explanatory diagram illustrating a network system 1002 including a relay device according to a fifth embodiment of the present invention.

FIG. 10 is an explanatory diagram illustrating a network system 1002 including relay devices according to a fifth embodiment of the present invention. The network system 1002 includes a network 800, two relay devices 100D1 and 100D2 which are connected to the network 800, and a Lightweight Directory Access Protocol (LDAP) server 804 connected to the network 800.

The configuration of the second relay device 100D2 is the same as that of the first relay device 100D1. In addition, the hardware configuration of the relay devices 100D1 and 100D2 is the same as that of the relay device 100 according to the first embodiment illustrated in FIG. 2. Hereinafter, those components of the relay devices 100D1 and 100D2 which are the same as those of the relay device 100 are denoted by the same reference numerals, respectively, and those components which are different from those in the first embodiment will be mainly described. FIG. 10 illustrates only a part of the configurations of the relay devices 100D1 and 100D2. In addition, among the functions (process sections) in each CPU 202, the relay execution section 210 and the wireless network control section 230 are not illustrated, and among the data stored in the nonvolatile memory 300, the setting information 320 and the program (control program corresponding to the program 302) are not illustrated. It should be noted that the relay devices 100D1 and 100D2 may be used instead of the relay devices 100, 100A, 100B, and 100C in the above respective embodiments.

The CPU 202 in this embodiment realizes functions as an application order output section 260 and an application order obtaining section 262, in addition to the functions as the process sections realized by the CPU 202 according to the fourth embodiment illustrated in FIG. 9.

In this embodiment, in the same manner as the relay device 100C in the fourth embodiment illustrated in FIG. 9, the individual application order allocation section 244 updates the permissible determination method list data. The application order output section 260 of the relay device 100D1 transmits the updated determination method list to the LDAP server 804. The application order obtaining section 262 of the relay device 100D2 obtains the updated determination method list from the LDAP server 804, and stores the obtained permissible determination method list data in the nonvolatile memory 300. Consequently, the relay devices 100D1 and 100D2 share the updated permissible determination method list data.

FIG. 10 illustrates a state where the second relay device 100D2 obtains, via the LDAP server 804, the determination method list 311 updated by the first relay device 100D1. The first relay device 100D1 performs permissible connection determination in response to a connection request from the client device 702, and updates the determination method list 311 (steps S600, S610, S620, and S630). Steps S600, S610, S620, and S630 are the same as steps S400, S410, S420, and S430, respectively in FIG. 9.

In accordance with the update of the determination method list, the application order output section 260 of the first relay device 100D1 transmits to the LDAP server 804 data representing the updated permissible determination method list data (permissible determination method list data 311 in this case) and the user identifier (USER1 in this case) (step S640).

The LDAP server 804 is a computer which includes a data receiving section 804*a*, a data storage section 804*b*, and a data transmitting section 804*c*. The data receiving section 804*a* associates the determination method list received from the relay device 100D1 the user identifier and stores the determination method list associated with the user identifier USER1 in the data storage section 804*b*. In response to a request which includes the user identifier received from the relay device 100D1, the data transmitting section 804*c* provides the relay device 100D1 with the determination method list which is associated with the user identifier USER1. The data storage section 804*b* is a nonvolatile memory such as a hard disk drive, a flash memory, or the like. Alternatively, the data storage section 804*b* may be a volatile memory (e.g., DRAM).

The application order obtaining section 262 of the second relay device 100D2 obtains from the LDAP server 804 the permissible determination method list data 311 which is associated with the user identifier "USER1" (step S650). In this case, in response to a request including the user identifier received from the application order obtaining section 262, the data transmitting section 804*c* of the LDAP server 804 transmits to the second relay device 100D2 (application order obtaining section 262) the permissible determination method list data (permissible determination method list data 311 in this case) which is associated with the user identifier USER1. The application order obtaining section 262 stores the obtained determination method list 311 in the nonvolatile memory 300 (step 660). In this state, if the second relay device 100D2 receives a connection request from the client device 702, the second relay device 100D2 performs the permissible connection determination in accordance with the updated permissible determination method list data 311.

In this manner, in this embodiment, since a plurality of relay devices share the application order, any of the plurality of relay devices can provide the users with the same convenience. The total number of relay devices which share the determination method list is not limited to two, but may be three or more. Further, the plurality of relay devices share the permissible determination method list data set for individual user identifiers. Thus, the plurality of relay devices can perform permissible connection determination suitable for the individual users.

The application order obtaining section 262 can obtain the determination method list at any time. For example, before the permissible connection determination section 220C performs permissible connection determination, the application order obtaining section 262 may obtain from the LDAP server 804 the permissible determination method list data which is associated with the user identifier to be used for the permissible connection determination. Alternatively, the application order obtaining section 262 may obtain data from the LDAP server 804 at regular intervals.

In addition, the application order output section 260 may output the permissible determination method list data at any time. For example, upon update of the permissible determination method list data, the application order output section 260 may output the updated permissible determination method list data. Alternatively, the application order output section 260 may output the permissible determination method list data upon reception of an instruction by the user.

Further, the server distributing the permissible determination method list data is not limited to the LDAP server 804. Instead, any server may be adopted which includes: a receiving section for receiving information indicating the application order (e.g., permissible determination method list data) from a relay device; a storage section for storing the received information; and an outputting section for output the stored information to the relay device. Further, without using such servers, the application order output section 260 of a certain relay device may directly transmit the updated determination method list to the application order obtaining section 262 of another relay device.

It should be noted that the present invention is not limited to the above-described embodiments, but may be embodied in various modes without deviating from the scope of the present invention. For example, the following modifications may be employed.

That is, in the above respective embodiments, the permissible connection determination methods are not limited to the above-described methods, but any arbitrary methods may be adopted. For example, the WPA2-PSK method and WPA-EAP methods may be adopted.

Further, the relay device may have a configuration which is obtained by arbitrarily combining the configurations of the relay devices in the above respective embodiments. For example, the relay device may have the configuration of the relay device 100 illustrated in FIGS. 2 and 3 and include the application order allocation section 240 illustrated in FIG. 7. In this case, the permissible connection determination section 220 (FIG. 2) may perform the permissible connection determination in accordance with the predetermined permissible determination method list data 310 as illustrated in FIG. 3. Then, as in the second embodiment illustrated in FIG. 7, if the application order allocation section 240 allocates the application order in accordance with an instruction by the user, the permissible connection determination section 220 (FIG. 2) may perform the permissible connection determination in accordance with the updated permissible determination method list data 310 in the same manner as the permissible connection determination section 220A illustrated in FIG. 7.

Further, the relay device may have the configuration of the relay device 100 illustrated in FIGS. 2 and 3 and include the individual application order allocation section 242 illustrated in FIG. 8. In this case, the permissible connection determination section 220 (FIG. 2) performs the permissible connection determination in accordance with the predetermined permissible determination method list data 310 as illustrated in FIG. 3. With respect to the user identifiers which are respectively associated with the permissible determination method list data by the individual application order allocation section 242 (FIG. 8), the permissible connection determination section 220 performs the permissible connection determination in accordance with the associated permissible determination method list data, in the same manner as the permissible connection determination section 220B according to the third embodiment illustrated in FIG. 8.

Further, the relay device may have the configuration of the relay device 100 illustrated in FIGS. 2 and 3 and include the individual application order allocation section 242 illustrated in FIG. 8 and the individual application order allocation section 244 illustrated in FIG. 9. In this case, the individual application order allocation section 242 (FIG. 8) allocates the application order to the plurality of permissible connection determination methods for individual user identifiers in accordance with instructions by individual users as in the third embodiment illustrated in FIG. 8. Further, in the same manner as the individual application order allocation section 244 in the fourth embodiment illustrated in FIG. 9, the individual application order allocation section 242 reflects, in the application order, which of the plurality of permissible connection determination methods has provided a positive determination result. With respect to the user identifier for which the permissible determination method list data is updated by the individual application order allocation section 242, the permissible connection determination section 220 (FIG. 2) performs the permissible connection determination in accordance with the updated permissible determination method list data. With respect to the user identifier for which the permissible determination method list data is not updated by the individual application order allocation section 242, the permissible connection determination section 220 performs the permissible connection determination in accordance with the predetermined permissible determination method list data as illustrated in FIG. 3.

Further, the relay device may have the configuration of the relay device 100B illustrated in FIG. 8 and include the individual application order allocation section 244 illustrated in FIG. 9. In this case, as in the third embodiment illustrated in FIG. 8, the individual application order allocation section 242 (FIG. 8) allocates the application order to the plurality of permissible connection determination methods for individual user identifiers in accordance with instructions by individual users. The permissible connection determination section 220B performs permissible connection determination in accordance with the application order allocated by the individual application order allocation section 242. Further, in the same manner as the individual application order allocation section 244 in the fourth embodiment illustrated in FIG. 9, the individual application order allocation section 242 reflects, in the application order, which of the plurality of permissible connection determination methods has provided a positive determination result. Thereafter, in the same manner as the permissible connection determination section 220C in the fourth embodiment illustrated in FIG. 9, the permissible connection determination section 220B performs permissible connection determination in accordance with the updated permissible determination method list data.

Further, the relay device may have the configuration of the relay device 100A illustrated in FIG. 7 and include the application order output section 260 and the application order obtaining section 262 illustrated in FIG. 10. Upon update of the permissible determination method list data by the application order allocation section 240 (FIG. 7), the application order output section 260 (FIG. 10) transmits to the LDAP server 804 the updated permissible determination method list data. The permissible connection determination section 220A (FIG. 7) performs permissible connection determination in accordance with the permissible determination method list data updated by the application order allocation section 240.

The application order obtaining section 262 (FIG. 10) obtains from the LDAP server 804 new permissible determination method list data to store the new data in the nonvolatile memory 300. In this case, in the same manner as the permissible connection determination section 220C in the fifth embodiment illustrated in FIG. 10, the permissible connection determination section 220A (FIG. 7) performs the permissible connection determination in accordance with the permissible determination method list data obtained by the application order obtaining section 262. In this case, the permissible determination method list data shared by the relay devices are commonly used for all the user identifiers. In the case of sharing determination method lists for individual user identifiers, the relay device may have the configuration of the relay device 100B in the third embodiment illustrated in FIG. 8 and include the application order output section 260 and the application order obtaining section 262 in the fifth embodiment illustrated in FIG. 10.

If the application order is yet to be changed (updated), the relay device may perform permissible connection determination in accordance with the predetermined application order as in the first embodiment illustrated in FIGS. 2 and 3. The predetermined application order may be an arbitrary order. For example, the predetermined application order may not necessarily be the same as the order of security.

Further, in the above respective embodiments, the configuration of the relay device is not limited to the above-described configurations (e.g., the configuration illustrated in FIG. 2), but various other configurations may be adopted. For example, the communication interface 510 may be an interface for power line communication (PLC) instead of the interface compliant with the IEEE802.3. In addition, the communication interface 510 may be an interface for wireless communication instead of an interface for wired communication. Further, the communication interface 510 may be divided into an interface for an outside network and an interface for an internal network. Further, the permissible determination method list data (e.g., permissible determination method list data 310 in FIG. 2) may be stored in a volatile memory (e.g., DRAM). Generally, data (e.g., setting information 320 in FIG. 2) used for controlling the relay device may be stored in the volatile memory. Further, the configuration of the network systems is not limited to the configurations according to the above respective embodiments, but various configurations may be adopted. For example, the first authentication process section 802a and the second authentication process section 802b in the first embodiment illustrated in FIG. 1 may be realized by different server devices. Such a network configuration can be strong against failures (communication failure, device failure, and the like). Further, it may be configured such that a plurality of networks are connected to a relay device.

Further, in the above embodiments, some of the components that are realized by hardware may be realized by software. Conversely, all or some of the components that are realized by software may be realized by hardware. For example, the function of the permissible connection determination section 220 in the first embodiment illustrated in FIG. 2 may be realized by a dedicated hardware circuit.

Further, if all or some of the functions of the present invention are realized by software, the software (computer program) may be provided by means of computer readable storage media, either transitory or nontransitory. The computer readable nontransitory storage medium includes not only portable storage media such as flexible disks and CD-ROMs, but also various internal storage units in computers such as RAMs and ROMs, and external storage units fitted to computers such as hard disks. The computer readable transitory medium includes, for example, a propagation signal having computer executable code embodied therein.

What is claimed is:

1. A relay device comprising:
   a wireless interface for wireless communication with one or more wireless communication devices;
   a communication interface for connection with a communication line, whereby the relay device is communicable with a communication device;
   a memory storing a plurality of lists of permit-connection determination methods;
   a permit-connection determination section for responding to a connection request from the one or more wireless communication devices through said wireless interface by exchanging communication-permission information with the one or more wireless communication devices to carry out successive communication-device authentication attempts according to the plurality of lists of permit-connection determination methods in said memory, either until an attempt is positive or until no attempt is positive;
   a relay execution section for executing relay of communications between the one or more wireless communication devices and the communication device if the permit-connection determination section has obtained a positive result of attempting to authenticate the one or more wireless communication devices;
   an identifier obtaining section configured to receive, from a plurality of connection-request-transmitting wireless communication devices, user identifiers individually identifying the request-transmitting wireless communication device users; and
   an individual order-allocation section for allocating an individual user-associated order to each of the plurality of lists of permit-connection determination methods, and storing the lists as user profiles associated with the user identifiers, wherein
   in responding to a request from one of the connection-request-transmitting wireless communication devices, the permit-connection determination section carries out the successive communication-device authentication attempts according to a user profile of permit-connection determination methods associated with the requesting request-transmitting device's corresponding user identifier obtained by the identifier obtaining section.

2. The relay device according to claim 1, wherein the plurality of lists of permit-connection determination methods stored in the memory are each in a predetermined prioritizing order.

3. The relay device according to claim 2, wherein the predetermined order of plurality of lists of permit-connection determination methods is according to descending level of security.

4. The relay device according to claim 1, further comprising:
   an order allocation section for allocating an order to the permit-connection determination methods in at least one of the plurality of lists stored in the memory, wherein
   the order is based on a user instruction allocating prioritizing order to the at least one of the plurality of lists of permit-connection determination methods.

5. The relay device according to claim 4, wherein:
   the user instruction according to which the order allocation section allocates the prioritizing order to the at least one of the plurality of lists of permit-connection determination methods is from one of the plurality of the request-transmitting device users,
   the order allocation section associates the request-transmitting device user identifier with the at least one of the plurality of lists of permit-connection determination methods to which the prioritizing order has been allocated, and
   the permit-connection determination section carries out the successive communication-device authentication attempts according to the prioritizing-ordered list of permit-connection determination methods associated with the request-transmitting device user identifier.

6. The relay device according to claim 4, further comprising:
   an allocated-order output section for outputting outside the relay device, in a form retrievable by a partner relay device, information indicating the prioritized order allocated by the order allocation section to the at least one of the plurality of lists of permit-connection determination methods stored in the memory; and
   an allocated-order obtaining section configured to receive, from outside the relay device, information indicating a second prioritizing order of permit-connection determination methods allocated by the partner relay device; wherein
   the permit-connection determination section carries out the successive communication-device authentication attempts according to the second prioritizing order of permit-connection determination methods obtained by the allocated-order obtaining section.

7. The relay device according to claim 1, wherein:
   in response to a positive authentication attempt by the permit-connection determination section for a connection-request-transmitting wireless communication device user-identified by the identifier obtaining section, the individual order-allocation section prioritizes the positive-authentication-resultant permit-connection determination method in the user profile associated with the request-transmitting device user, and stores in the memory the prioritized user profile associated with the request-transmitting device user for subsequent authentication of the request-transmitting device.

8. A method for relaying communication between at least one wireless communication device and a communication device, the method comprising:
   responding to a connection request from the at least one wireless communication device by exchanging communication-permission information with the at least one wireless communication device to carry out successive communication-device authentication attempts ordered according to a plurality of lists including one or more ordered permit-connection determination methods, either until the next-in-order attempt is positive or until no attempt is positive;
   receiving, from a plurality of connection-request-transmitting wireless communication devices, user identifiers individually identifying the request-transmitting wireless communication device users;
   allocating an individual user-associated order to each of the plurality of lists of permit-connection determination methods, and storing the lists in a memory as user profiles associated with the user identifiers; and
   executing relay of communications between the connection-requesting wireless communication device and the communication device if the communication-device authentication attempt function has obtained a positive result, wherein in responding to a request from one of the connection-request-transmitting wireless communication devices, the successive communication-device authentication attempts are carried out according to a user profile of permit-connection determination methods associated with the requesting request-transmitting device's corresponding user identifier.

9. A nontransitory storage medium having stored therein a program for causing a central processing unit of a wireless communication relay device, connected via a communication line to a communication device, to execute the functions of:

responding to a connection request from at least one wireless communication device by exchanging communication-permission information with the at least one wireless communication device to carry out successive communication-device authentication attempts ordered according to a plurality of lists including one or more ordered permit-connection determination methods, either until the next-in-order attempt is positive or until no attempt is positive;

receiving, from a plurality of connection-request-transmitting wireless communication devices, user identifiers individually identifying the request-transmitting wireless communication device users;

allocating an individual user-associated order to each of the plurality of lists of permit-connection determination methods, and storing the lists in a memory as user profiles associated with the user identifiers; and executing relay of communications between the connection-requesting wireless communication device and the communication device if the communication-device authentication attempt function has obtained a positive result, wherein in responding to a request from one of the connection-request-transmitting wireless communication devices, the successive communication-device authentication attempts are carried out according to a user profile of permit-connection determination methods associated with the requesting request-transmitting device's corresponding user identifier.

\* \* \* \* \*